US008684556B2

(12) United States Patent
Negley et al.

(10) Patent No.: US 8,684,556 B2
(45) Date of Patent: Apr. 1, 2014

(54) LIGHT EMITTING DIODE (LED) LIGHTING SYSTEMS INCLUDING LOW ABSORPTION, CONTROLLED REFLECTANCE AND DIFFUSION LAYERS

(75) Inventors: Gerald H. Negley, Chapel Hill, NC (US); Paul Kenneth Pickard, Morrisville, NC (US)

(73) Assignee: Cree, Inc., Durham, NC (US)

( * ) Notice: Subject to any disclaimer, the term of this patent is extended or adjusted under 35 U.S.C. 154(b) by 780 days.

(21) Appl. No.: 12/835,390

(22) Filed: Jul. 13, 2010

(65) Prior Publication Data
US 2011/0075410 A1 Mar. 31, 2011

Related U.S. Application Data

(63) Continuation-in-part of application No. 12/570,571, filed on Sep. 30, 2009, now Pat. No. 8,360,604.

(51) Int. Cl.
*F21V 1/00* (2006.01)

(52) U.S. Cl.
USPC ........................ 362/235; 362/231; 362/249.02

(58) Field of Classification Search
None
See application file for complete search history.

(56) References Cited

U.S. PATENT DOCUMENTS

| | | | |
|---|---|---|---|
| 6,898,012 B2 | 5/2005 | Kaminsky et al. |
| 7,055,987 B2 | 6/2006 | Staufert |
| 7,132,136 B2 | 11/2006 | Laney et al. |
| 7,160,012 B2 | 1/2007 | Hilscher et al. |
| 7,408,709 B2 | 8/2008 | Shimoda et al. |
| 2003/0165060 A1 | 9/2003 | Ouderkirk |
| 2006/0237636 A1 | 10/2006 | Lyons et al. |
| 2007/0247414 A1 | 10/2007 | Roberts |
| 2007/0284592 A1 | 12/2007 | Haase |
| 2008/0225553 A1 | 9/2008 | Roberts et al. |
| 2009/0303411 A1 | 12/2009 | Kawato et al. |
| 2010/0321919 A1 | 12/2010 | Yang |
| 2011/0075410 A1 | 3/2011 | Negley et al. |

OTHER PUBLICATIONS

Flashlight News. Cree Announces Volume Availability of Cree LR24 Luminaire. Article [Online]. 2008 [retrieved on Jan. 3, 2011]. Retrieved from the internet; URL: http://flashlightnews.org/story1865.shtml ; 2 pages.
Furukawa America Inc. Furukawa America Debuts MCPET Reflective Sheets to Improve Clarity and Efficiency of Lighting Fixtures. 2007. [retrieved on Jan. 3, 2011]. Retrieved from the internet; URL: http://www.thefreelibrary.com/Furukawa+America+Debuts+MCPET+Reflective+Sheets+to+Improve+Clarity...-a0163370179; pp. 1-3.
Notification of Transmittal of the International Search Report and the Written Opinion of the International Searching Authority, or the Declaration; International Search Report; Written Opinion of the International Searching Authority corresponding to International Application No. PCT/US2010/048843 dated Jan. 20, 2011; 13 pages.
International Preliminary Report on Patentability, PCT/US10/48843, May 16, 2012.
"Bright Tomorrow Lighting Competition (L Prize™)", May 28, 2008, Document No. 08NT006643.

(Continued)

*Primary Examiner* — Britt D Hanley
(74) *Attorney, Agent, or Firm* — Myers Bigel Sibley & Sajovec, P.A.

(57) ABSTRACT

LED lighting systems include LEDs of at least two different colors, a reflective layer and a diffusion layer. The reflective layer has a transmittance-to-reflectance ratio that is configured to homogenize intensity of the light emitted from the LEDs. The diffusion layer is configured to homogenize color uniformity of the light.

49 Claims, 6 Drawing Sheets

(56) References Cited

OTHER PUBLICATIONS

"*Energy Star® Program Requirements for Solid State Lighting Luminaires, Eligibility Criteria*—Version 1.1", Final: Dec. 19, 2008.
"*MCPET*", downloaded Jun. 25, 2009 from http:trocellen.com/index.php?option=com_content&view=article&id=96&Itemid=. . . .
Bright View Technologies, Inc., "*Microstructure Based Optical Film*", downloaded Mar. 18, 2010 from http://www.brightviewtechnologies.com.
Cree LED Lighting, Data Sheet "*LED Architectural Lay-In*", Document No. LR24PI/07/2009, copyright 2007-2009, 5 pp.
DuPont "*DuPont™ Diffuse Light Reflector*", Publication K-20044, May 2008, 2 pp.
Furukawa Electric Co., Ltd., Data Sheet, "*New Material for Illuminated Panels Microcellular Reflective Sheet MCPET*", updated Apr. 8, 2008, 2 pp.

Fusion Optix, Inc., "*Diffusion Films*", downloaded Mar. 18, 2010 from http://www.fusionoptix.com/products/optical-films/diffusion-films/overview.htm.
Fusion Optix, Inc., White Paper, "*Lighting: Obscuration of LEDs*", downloaded from http://www.fusionoptix.com/products/opticalcomponents/optical-films/diffusion-films/downloads.htm.
LEDs Magazine, Press Release May 23, 2007, "*Furukawa America Debuts MCPET Reflective Sheets to Improve Clarity, Efficiency of Lighting Fixtures*", downloaded Jun. 25, 2009 from http://www.ledsmagazine.com/press/15145, 2 pp.
Luminit, "*Shaping Light as Needed*", downloaded Mar. 18, 2010 from http://216.154.222.249/node/1.
Luminit, Data Sheet "*LED Lighting Applications*", downloaded from http://216.154.222.249/Datasheets_and_Applications.
Trocellen, Data Sheet "*MCPET—Microcellular Pet Sheet*" downloaded from http://trocellen.com.
Wikipedia, "*Double-slit experiment*", downloaded Mar. 3, 2010 from http:/en.wikipedia.org/w/index.php?title=Double-slit_experiment&printable=yes.

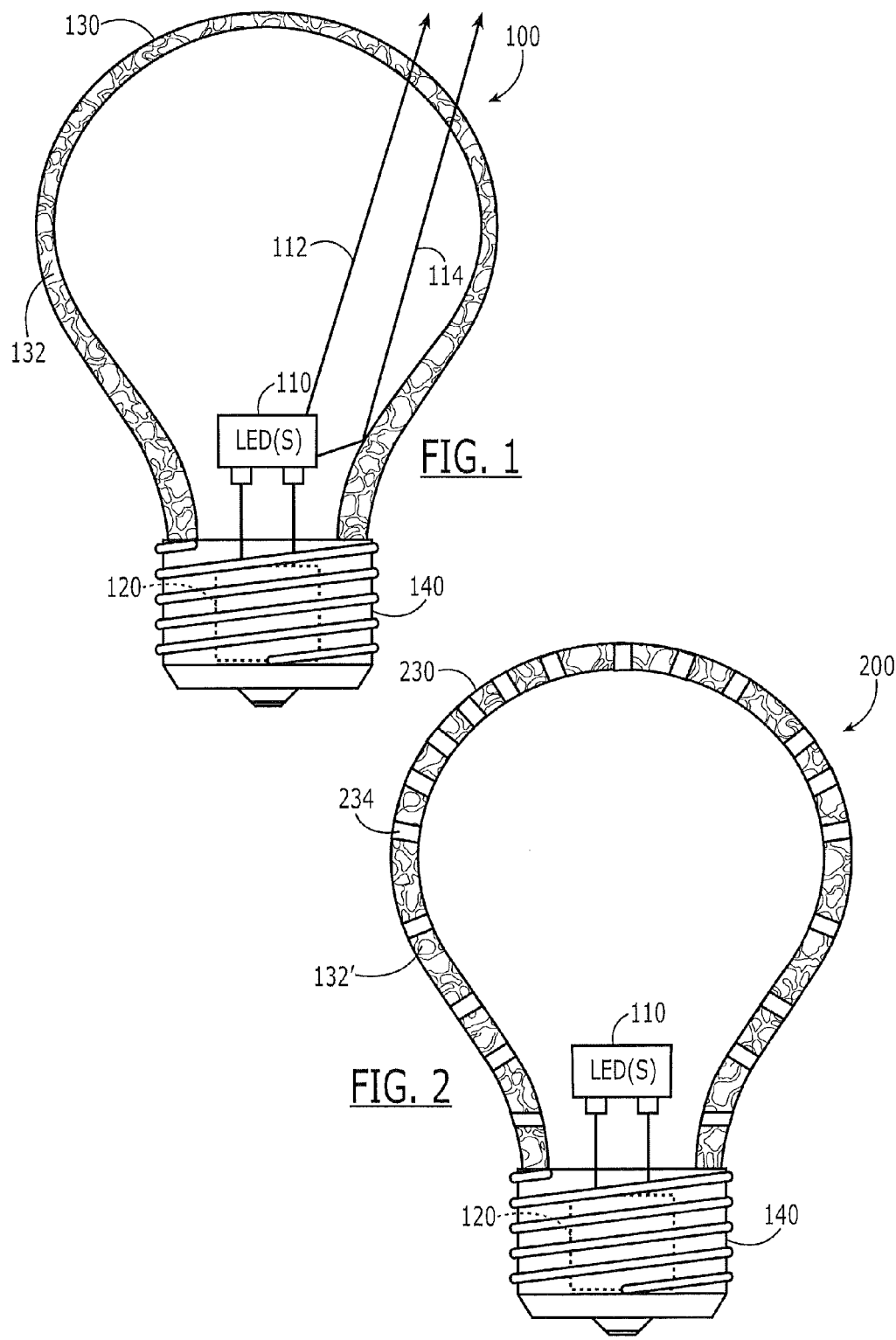

LIGHT EMITTING DIODE (LED) LIGHTING SYSTEMS INCLUDING LOW ABSORPTION, CONTROLLED REFLECTANCE AND DIFFUSION LAYERS

CROSS-REFERENCE TO RELATED APPLICATION

The present application is a continuation-in-part (CIP) of U.S. patent application Ser. No. 12/570,571, filed Sep. 30, 2009, now U.S. Pat. No. 8,360,604 entitled Light Emitting Diode (LED) Lighting Systems Including Low Absorption, Controlled Reflectance Enclosures, assigned to the assignee of the present application, the disclosure of which is hereby incorporated herein by reference in its entirety as if set forth fully herein.

BACKGROUND OF THE INVENTION

This invention relates to lighting systems and, more particularly, to lighting systems that use light emitting diodes (LEDs).

LEDs are increasingly being used in lighting/illumination applications, such as traffic signals, color wall wash lighting, backlights, displays and general illumination, with one ultimate goal being a replacement for the ubiquitous incandescent light bulb. In order to provide a broad spectrum light source, such as a white light source, from a relatively narrow spectrum light source, such as an LED, the relatively narrow spectrum of the LED may be shifted and/or spread in wavelength.

For example, a white LED may be formed by coating a blue emitting LED with an encapsulant material, such as a resin or silicon, that includes therein a wavelength conversion material, such as a YAG:Ce phosphor, that emits yellow light in response to stimulation with blue light. Some, but not all, of the blue light that is emitted by the LED is absorbed by the phosphor, causing the phosphor to emit yellow light. The blue light emitted by the LED that is not absorbed by the phosphor combines with the yellow light emitted by the phosphor, to produce light that is perceived as white by an observer. Other combinations also may be used. For example, a red emitting phosphor can be mixed with the yellow phosphor to produce light having better color temperature and/or better color rendering properties. Alternatively, one or more red LEDs may be used to supplement the light emitted by the yellow phosphor-coated blue LED. In other alternatives, separate red, green and blue LEDs may be used. Moreover, infrared (IR) or ultraviolet (UV) LEDs may be used. Finally, any or all of these combinations may be used to produce colors other than white.

LEDs also may be energy efficient, so as to satisfy ENERGY STAR® program requirements. ENERGY STAR program requirements for LEDs are defined in "*ENERGY STAR® Program Requirements for Solid State Lighting Luminaires, Eligibility Criteria—Version 1.1*", Final: Dec. 19, 2008, the disclosure of which is hereby incorporated herein by reference in its entirety as if set forth fully herein.

In order to encourage development and deployment of highly energy efficient solid state lighting (SSL) products to replace several of the most common lighting products currently used in the United States, including 60-watt A19 incandescent and PAR 38 halogen incandescent lamps, the Bright Tomorrow Lighting Competition (L Prize™) has been authorized in the Energy Independence and Security Act of 2007 (EISA). The L Prize is described in "*Bright Tomorrow Lighting Competition (L Prize™)*", May 28, 2008, Document No. 08NT006643, the disclosure of which is hereby incorporated herein by reference in its entirety as if set forth fully herein. The L Prize winner must conform to many product requirements including light output, wattage, color rendering index, correlated color temperature, dimensions and base type.

SUMMARY OF THE INVENTION

LED lighting systems according to various embodiments described herein include at least one LED and an enclosure adjacent the at least one LED, that is configured so that at least some light that is emitted by the at least one LED passes through the enclosure. The enclosure has a transmittance-to-reflectance ratio that is configured to homogenize light that emerges from the enclosure (1) directly from the at least one LED, and (2) after one or more reflections within the enclosure. Accordingly, the enclosure is configured to control the relative amount of light that is transmitted and reflected, so that the light is evenly diffused and the colors inside the disclosures are mixed to provide homogeneous light that emerges from the enclosure.

In some embodiments, the enclosure has less than about 10%, and in other embodiments less than about 4%, total absorption of the light that is emitted by the at least one LED. In some embodiments, the enclosure comprises a microcellular layer having a mean cell diameter of less than about 10 μm. In other embodiments, the enclosure comprises a microporous layer. In some embodiments, the enclosure comprises low absorption diffusing material such as a layer of microcellular polyethylene terephthalate (MCPET) and/or a layer of Diffuse Light Reflector (DLR) material.

In other embodiments, the enclosure has a transmittance-to-reflectance ratio that varies at different locations thereof. In some embodiments, the microcellular layer of MCPET and/or DLR material is of variable thickness at different locations thereof to provide the transmittance-to-reflectance ratio that varies at different locations thereof. In other embodiments, the microcellular layer of MCPET and/or DLR material includes a non-uniform array of holes extending therethrough to provide the transmittance-to-reflectance ratio that varies at different locations thereof. Yet other embodiments can provide a layer of variable thickness and/or a patterned layer on the layer of MCPET and/or DLR material. In yet other embodiments, the enclosure comprises a reflective layer having an array of holes thereof.

In still other embodiments, the enclosure comprises a bulb-shaped enclosure and a screw-type base at the base of the bulb-shaped enclosure. The bulb-shaped enclosure may have higher transmittance-to-reflectance ratio remote from the screw-type base than adjacent the screw-type base. In still other embodiments, the LED lighting system may conform to the ENERGY STAR Program Requirements for Solid State Lighting Luminaires. In yet other embodiments, the LED lighting system may further conform to the product requirements for light output, wattage, color rendering index, correlated color temperature, dimensions and base type of a 60-watt A19 or a PAR 38 Incandescent Replacement for the L Prize.

Many different embodiments of LEDs may be provided in LED lighting systems described herein. For example, in some embodiments, the at least one LED comprises first and second LEDs of different colors. In other embodiments, the at least one LED comprises first and second spaced apart LEDs of same color. Combinations of these and/or other embodiments also may be provided.

LED lighting systems according to still other embodiments, provide at least one LED and a layer adjacent the at least one LED that is configured so that at least some light that is emitted by the at least one LED passes through the layer. The layer has less than about 10% total absorption of the light that is emitted by the at least one LED and has a transmittance-to-reflectance ratio that that varies at different locations thereof. In other embodiments, the layer may have less than about 4% total absorption, may comprise low absorption microcellular/microporous diffusing material such as MCPET and/or DLR material, may be of variable thickness and/or may include a non-uniform array of holes extending therethrough, as was described above. The layer may also comprise a bulb-shaped layer, and the LED lighting system may conform to the ENERGY STAR Program Requirements for Solid State Lighting Luminaires or a 60-watt A19 or a PAR 38 Incandescent Replacement for the L Prize, as was described above. The LEDs also may comprise various combinations of LEDs, as was described above.

Still other embodiments provide an LED lighting system that includes at least one LED and a layer adjacent the at least one LED that is configured so that at least some light that is emitted by the at least one LED passes through the layer. The layer comprises light diffusing material having less than 4% total absorption of the light that is emitted by the at least one LED. In some embodiments, the enclosure comprises a layer of microcellular polyethylene terephthalate (MCPET) and/or a layer of Diffuse Light Reflector (DLR) material. The layer may be of variable thickness and/or may include a non-uniform array of holes extending therethrough, as was described above. The layer may also comprise a bulb-shaped layer, and the LED lighting system may conform to the ENERGY STAR Program Requirements for Solid State Lighting Luminaires or a 60-watt A19 or a PAR 38 Incandescent Replacement for the L Prize, as was described above. The LEDs also may comprise various combinations of LEDs, as was described above.

LED lighting systems according to other embodiments described herein include a plurality of LEDs of at least two different colors. A reflective layer is configured so that at least some of the light of two different colors impinges on and emerges through the reflective layer. The reflective layer has a transmittance-to-reflectance ratio that is configured to homogenize intensity of the light that emerges through the reflective layer. A diffusion layer is provided on the reflective layer opposite the plurality of LEDs, so that at least some of the light that emerges from the reflective layer impinges on and emerges through the diffusion layer. The diffusion layer is configured to homogenize color uniformity of the light that emerges from the reflective layer. Accordingly, at least some of the color non-uniformity that is produced by the reflective layer may be homogenized by the diffusion layer.

In some embodiments, the reflective layer that has less than about 10% total absorption and in other embodiments less than about 4% total absorption of the light that impinges thereon. In some embodiments, the diffusion layer has less than about 15% total absorption of the light that impinges thereon. In some embodiments, the reflective layer comprises a microcellular layer having a mean cell diameter of less than about 10 µm, a microporous layer, a layer of MCPET and/or a layer of DLR material, as was described above.

In other embodiments, the reflective layer has a transmittance-to-reflectance ratio that varies at different locations thereof. In some embodiments, the layer of MCPET and/or DLR material is of variable thickness at different locations thereof, to provide the transmittance-to-reflectance ratio that varies at different locations thereof. In other embodiments, the layer of MCPET and/or DLR material includes a non-uniform array of holes extending therethrough to provide the transmittance-to-reflectance ratio that varies at different locations thereof.

In some embodiments, the diffusion layer may comprise a random array of light diffusing features. In particular, the diffusion layer may comprise a randomly spaced and/or sized array of microlenses.

In some embodiments, the plurality of LEDs of different colors may comprise a planar array of LEDs, and the reflective layer and the diffusion layer may also be planar. In some embodiments, the LED lighting system is an LR-24 architectural luminaire. Moreover, in some embodiments, the plurality of LEDs may comprise at least one white LED and at least one red LED. In other embodiments, the plurality of LEDs may comprise at least one blue shifted yellow LED, at least one blue LED and at least one red LED. In yet other embodiments, the plurality of LEDs may comprise at least one blue shifted yellow LED and at least one red LED. In some embodiments, the LED lighting system may conform to the ENERGY STAR Program Requirements for Solid State Lighting Luminaires.

In other embodiments, more than one reflective layer may be provided. Thus, a second reflective layer may be provided on a first reflective layer wherein the second reflective layer has a transmittance-to-reflectance ratio that varies at different locations thereof differently than that of the first reflective layer. In some embodiments, a second layer of MCPET and/or DLR material may be provided on a first layer of MCPET and/or DLR material. The second layer may include a non-uniform array of holes extending therethrough that are not congruent to the holes that extend through the first layer of MCPET and/or DLR material.

LED lighting systems according to still other embodiments may include an enclosure that comprises an enclosure floor, an enclosure ceiling and at least one enclosure wall therebetween. A substrate is provided adjacent the enclosure floor. A plurality of LEDs of at least two different colors are provided on the substrate facing the enclosure ceiling. The enclosure ceiling may comprise a reflective layer and a diffusion layer, as described in any of the above embodiments. Moreover, the enclosure wall(s) and/or the enclosure floor may also comprise MCPET and/or DLR material. The LED lighting system may conform to the ENERGY STAR Program Requirements for Solid State Lighting Luminaires, as was described above.

Still other embodiments of LED lighting systems include a plurality of LEDs of at least two different colors, a first layer comprising MCPET and/or DLR material configured so that at least some of the light of at least two different colors impinges on and emerges through the first layer and a second layer comprising a randomly spaced and/or sized array of light diffusion features on the first layer opposite the plurality of LEDs, so that at least some of the light that emerges from the first layer impinges on and emerges through the second layer. The first and second layers may be configured according to any of the embodiments described above, a second layer of MCPET and/or DLR material may also be provided as described above and the LED lighting system may conform to the ENERGY STAR Program Requirements for Solid State Lighting Luminaires as described above.

Finally, still other embodiments described herein can provide a lighting system that comprises a plurality of solid state light emitters of at least two different colors and a low absorption, partially reflective, partially diffusive layer configured so that at least some of the light of at least two different colors impinges on and emerges through the low absorption, partially reflective, partially diffusive layer. In other embodiments, the low absorption, partially reflective, partially diffusive layer comprises a reflective layer and a diffusion layer on the reflective layer. In yet other embodiments, the reflective layer is between the plurality of solid state light emitters of at least two different colors and the diffusion layer.

BRIEF DESCRIPTION OF THE DRAWINGS

FIGS. 1-11 are side cross-sectional views of LED lighting systems according to various embodiments.

DETAILED DESCRIPTION

Figure 3:
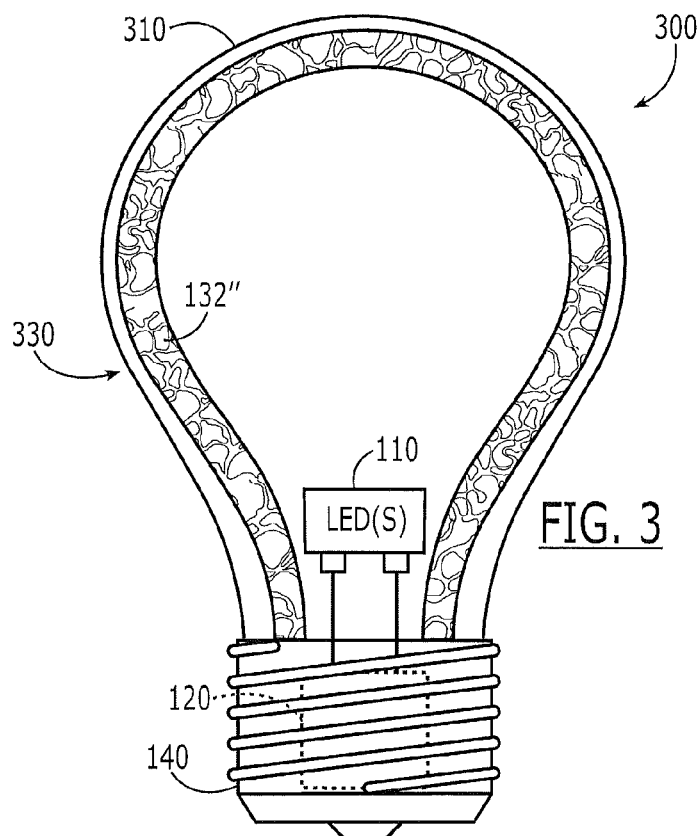

The present invention now will be described more fully with reference to the accompanying drawings, in which various embodiments are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components. Finally, "a layer of MCPET" means "a layer comprising MCPET", and "a layer of DLR material" means "a layer comprising DLR material".

It will be understood that when an element such as a layer, region or substrate is referred to as being "on" another element, it can be directly on the other element or intervening elements may also be present. Furthermore, relative terms such as "beneath" or "overlies" may be used herein to describe a relationship of one layer or region to another layer or region relative to a substrate or base as illustrated in the figures. It will be understood that these terms are intended to encompass different orientations of the device in addition to the orientation depicted in the figures. Finally, the term "directly" means that there are no intervening elements. As used herein, the term "and/or" includes any and all combinations of one or more of the associated listed items and may be abbreviated as "/".

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Embodiments of the invention are described herein with reference to cross-sectional and/or other illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, a region illustrated or described as a rectangle will, typically, have rounded or curved features due to normal manufacturing tolerances. Thus, the regions illustrated in the figures are schematic in nature and their shapes are not intended to illustrate the precise shape of a region of a device and are not intended to limit the scope of the invention, unless otherwise defined herein. Moreover, all numerical quantities described herein are approximate and should not be deemed to be exact unless so stated.

Unless otherwise defined herein, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As used herein, a layer or region is considered to be "transparent" when at least 50% of the radiation that impinges on the transparent layer or region emerges through the transparent layer or region. Moreover, the term "phosphor" is used synonymously for any wavelength conversion material(s). The term "ENERGY STAR" is defined by "*ENERGY STAR Program Requirements for Solid State Lighting Luminaires, Version* 1.0", cited above. The term "L Prize" is defined by the "*Bright Tomorrow Lighting Competition (L Prize™)*" Publication No. 08NT006643, cited above.

Some embodiments described herein can use gallium nitride (GaN)-based LEDs on silicon carbide (SiC)-based mounting substrates. However, it will be understood by those having skill in the art that other embodiments of the present invention may be based on a variety of different combinations of mounting substrate and epitaxial layers. For example, combinations can include AlGaInP LEDs on GaP mounting substrates; InGaAs LEDs on GaAs mounting substrates; AlGaAs LEDs on GaAs mounting substrates; SiC LEDs on SiC or sapphire ($Al_2O_3$) mounting substrates and/or Group III-nitride-based LEDs on gallium nitride, silicon carbide, aluminum nitride, sapphire, zinc oxide and/or other mounting substrates. Moreover, in other embodiments, a mounting substrate may not be present in the finished product. In some embodiments, the LEDs may be gallium nitride-based LED devices manufactured and sold by Cree, Inc. of Durham, N.C., and described generally at cree.com.

FIG. 1 is a schematic cross-sectional view of an LED lighting system according to various embodiments. Referring to FIG. 1, the LED lighting system 100 includes at least one LED 110 and a power supply 120 that is electrically connected to, and in some embodiments spaced apart from, the at least one LED 110. The power supply 120 may provide a ballast for the LED lighting system 100 by converting an input alternating current (AC) to a direct current (DC). However, in other embodiments, the power supply 120 may only include a resistor or any other device that sets a bias current for the at least one LED 110. In yet other embodiments, a power supply 120 need not be provided.

The at least one LED 110 may include a bare LED die, an encapsulated or packaged LED and/or an LED (bare or encapsulated) with phosphor thereon. Moreover, multiple LEDs may also be provided in various combinations and subcombinations. In some embodiments, a red LED is provided in addition to a blue LED. The use of a red LED to supplement a blue LED is described, for example, in U.S. Pat. No. 7,213,940 to the present inventors, the disclosure of which is hereby incorporated herein by reference in its entirety as if set forth fully herein.

Still referring to FIG. 1, an enclosure 130 is also provided adjacent the at least one LED 110, and in some embodiments that surrounds the at least one LED 110, so that at least some light that is emitted by the at least one LED 110 passes through the enclosure 130. The enclosure has low total absorption of the light that is emitted by the at least one LED 110. In some embodiments, the enclosure 130 has less than about 10% total absorption and in other embodiments, less than about 4% total absorption is provided. In still other embodiments, less than about 2% absorption is provided. In FIG. 1, the enclosure 130 is configured to provide a replacement for conventional "A-type" form factor light bulbs. In these embodiments, the enclosure 130 is a bulb-shaped enclosure, and a screw-type base 140 is provided at the base of the enclosure 130. In embodiments of FIG. 1, the at least one LED 110 is included within the bulb-shaped enclosure 130, and the power supply 120 is included within the base 140. However, in other embodiments, the power supply 120 may also be included at least partially outside the base 140, or may be omitted.

According to various embodiments described herein, the enclosure 130 also has a transmittance-to-reflectance ratio that is configured to homogenize light that emerges from the enclosure 130 directly from the at least one LED, as shown by the light ray 112, and after one or more reflections within the enclosure, as shown by light ray 114. Thus, the transmittance-to-reflectance ratio of the low absorption enclosure is controlled so that light is evenly diffused and mixed within the enclosure, to provide a homogeneous light output from the enclosure.

Some embodiments described herein may arise from recognition that a new class of low absorption diffusing light reflector materials has recently been developed. These materials include microcellular polyethylene terephthalate (MC-PET) and Diffused Light Reflector (DLR) materials. These low absorption microcellular materials are white diffusing materials that can provide reflectance that is at least 96%, and may be as high as 98%, across the visible spectrum. These microcellular materials have a mean cell diameter of less than about 10 μm to create a microporous material. These materials have been used as reflectors in fluorescent light fixtures, and can increase fixture light output as much as 20% or more. According to various embodiments described herein, a different use has been made for these materials, i.e., as an enclosure layer that is configured so that almost all of the light passes through the enclosure with low total absorption. However, the configuration of the layer may be tailored to provide a desired transmittance-to-reflectance ratio, so as to homogenize the light that emerges from the enclosure, whether the light emerges directly from the LED or after one or more reflections or bounces within the enclosure.

Even more specifically, it is known that light that impinges on a material is impacted by the absorption, transmission and reflection of the material. Various materials described herein may have less than about 10% total absorption in some embodiments. In other embodiments, less than about 4% total absorption may be provided, and in other embodiments, less than about 2% total absorption may be provided. The remaining light that is not absorbed is either transmitted through the material or reflected from the material. For example, a range of transmission of between about 10% and about 80% may be provided, and conversely a range of reflection from about 80% to about 10% may be provided, wherein the absorption, transmission and reflection add to 100%. The low absorption material may be modified geometrically and/or by the addition of a coating layer thereon, to provide a desired transmittance-to-reflectance ratio that is configured to homogenize light that emerges from the enclosure directly from the at least one LED and after one or more reflections within the enclosure.

As is known to those having skill in the art, MCPET reflective sheets may comprise micro-foamed polyethylene terephthalate having a mean cell diameter of about 10 μm or less, i.e., less than about 10 μm. The MCPET sheets may exhibit a total reflectivity of 99% or more and a diffuse reflectivity of 96% or more. Thus, the microcellular structure randomizes and scatters the light impinging thereon. Moreover, MCPET sheets can reflect blue light with wavelengths of 400 nm and red light with wavelengths of 700 nm nearly equally. A 1-mm thick MCPET sheet may achieve a total light reflectivity of 99% and a diffuse reflectivity of 96% compared to conventional mirrored or metallic reflection panels that achieve only 10% diffuse reflectance ratio and restrict the total light reflected to a single direction. MCPET is further described in the data sheet entitled "*New Material for Illuminated Panels Microcellular Reflective Sheet MCPET*", by the Furukawa Electric Co., Ltd., updated Apr. 8, 2008, and in a publication entitled "*Furukawa America Debuts MCPET Reflective Sheets to Improve Clarity, Efficiency of Lighting Fixtures*", LED Magazine, 23 May 2007, the disclosures of both of which are hereby incorporated herein by reference in their entirety as if set forth fully herein.

As is also known to those having skill in the art, DLR reflective sheets are marketed by DuPont. The DuPont™ DLR is a white material providing reflectance as high as 98% across the visible spectrum. Used as a reflector in fluorescent light fixtures, it can increase fixture light output as much as 20%. DLR material is further described in a data sheet entitled "*DuPont™ Diffuse Light Reflector*", DuPont publication K-20044, May 2008, and is also described at diffuselightreflector.dupont.com, the disclosures of both of which are hereby incorporated herein by reference in their entirety as if set forth fully herein.

It will also be understood that although MCPET and DLR have been described extensively herein, other microcellular light diffusing material having less than about 4%, and in some embodiments less than about 2%, total absorption of the light that is emitted by the at least one LED 110 may also be used in various other embodiments. These materials may be referred to generally as "low absorption diffusing materials".

Some embodiments described herein may arise from recognition that a microcellular layer may be made sufficiently thin or otherwise tailored so that the microcellular structures define micropores therebetween, which can allow a desired amount of the light to be transmitted through the material. Thus, rather than total reflection, some of the light may be transmitted through the microcellular light diffusing material. The transmittance-to-reflectance ratio may be tailored by adjusting the thickness and/or particle size of the microcellular light diffusing material and/or by adding one or more coating layers thereto.

According to various embodiments described herein, at least a portion of the enclosure 130 comprises a layer of low absorption diffusing material such as a layer of MCPET and/or DLR material 132. In some embodiments, the enclosure 130 has a transmittance-to-reflectance ratio that varies across the enclosure 130. In other embodiments, the layer of MCPET/DLR itself has a variable transmittance-to-reflectance ratio. For example, as shown in FIG. 1, the layer of MCPET/DLR 132 is of variable thickness to provide a transmittance-to-reflectance ratio that varies across the enclosure 130. As also in shown in FIG. 1, in some embodiments, the layer of MCPET/DLR 132 is thicker adjacent the base 140 than remote from the base 140 to provide a higher transmittance-to-reflectance ratio remote from the base 140 than adjacent the base 140. In some embodiments, the entire enclosure 130 may consist of the layer of MCPET/DLR 132. In other embodiments, the layer of MCPET/DLR 132 may itself be on another layer that provides structural support and/or other mechanical, optical and/or thermal properties.

The thickness and/or change in thickness of the layer of MCPET/DLR 132 may vary considerably based on the configuration of the LEDs 110 and the enclosure 130. The change in thickness may be abrupt or may be gradual, and need not be monotonic or symmetrical. Accordingly, embodiments of FIG. 1 also illustrate embodiments wherein at least a portion of the enclosure has a transmittance-to-reflectance ratio that varies across the enclosure.

FIG. 2 illustrates other embodiments of LED lighting systems 200. In these embodiments, the enclosure 230 is provided with a variable transmittance-to-reflectance ratio by providing a non-uniform array of holes 234 that extend through a layer of low absorption diffusing material such as MCPET/DLR 132' that is of uniform thickness. The non-uniform array of holes 234 may be more closely spaced remote from the base 140 than adjacent the base 140, as illustrated in FIG. 2. However, many other configurations may be provided according to other embodiments. The non-uniform array of holes 234 may also be provided by changing the packing density, shape and/or size of the holes 234. It will also be understood that combinations of non-uniform thickness enclosures of FIG. 1 and non-uniform arrays of holes 234 of FIG. 2 may also be provided.

In FIGS. 1 and 2, the enclosure 130/230 consists of a layer of MCPET/DLR 132/132', so that in these embodiments the variation in the transmittance-to-reflectance ratio may be provided by the layer of MCPET/DLR itself. Other embodiments, illustrated for example in FIGS. 3-4, include a multi-layer enclosure that includes a layer of MCPET/DLR, wherein the enclosure has a variable transmittance-to-reflectance ratio thereacross.

For example, as shown in FIG. 3, an LED lighting system 300 includes an enclosure 330 comprising a layer of low absorption diffusing material such as MCPET/DLR 132" of constant thickness and a layer 310 of variable thickness on the layer of MCPET/DLR 132" of constant thickness. The layer 310 of variable thickness may comprise a conventional diffusive material. As shown in FIG. 3, the layer 310 of variable thickness may be thicker adjacent the base 140 than remote from the base 140. Moreover, although the layer of variable thickness 310 is shown outside the layer of MCPET/DLR 132", it may alternatively or additionally be provided inside the layer of MCPET/DLR 132". Embodiments of FIGS. 1, 2 and 3 may also be combined by providing a layer of variable thickness 310 in addition to a layer of MCPET/DLR of variable thickness 132 and/or including holes 234. In still other embodiments, the layer 310 may have constant thickness and the layer of MCPET/DLR 132" may have a variable thickness.

Figure 4:
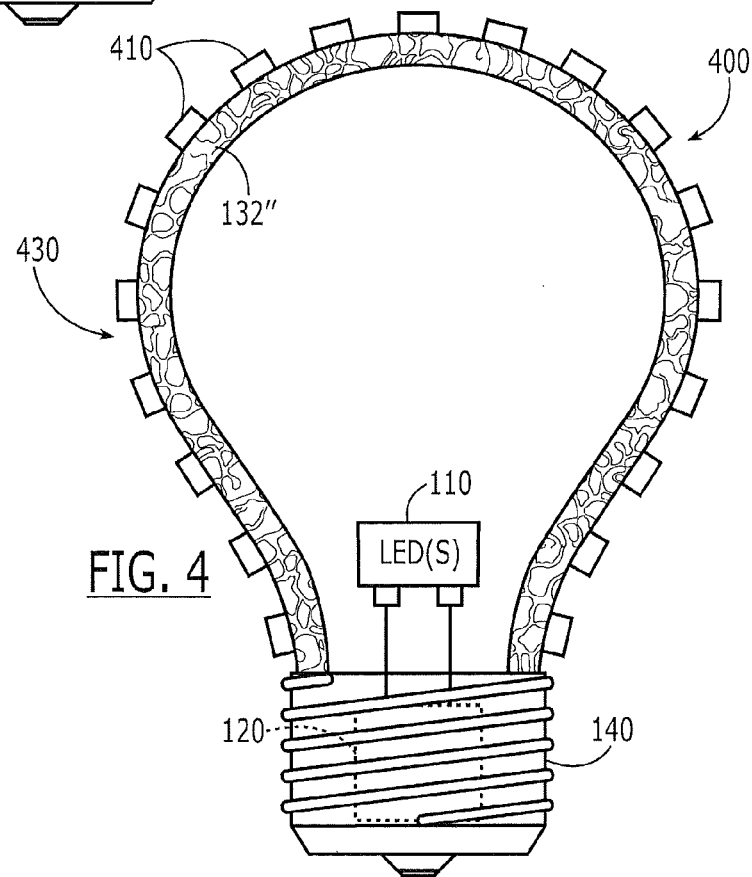

FIG. 4 is a cross-sectional view of LED lighting systems according to still other embodiments. These LED lighting systems 400 include a layer of low absorption diffusing material such as MCPET/DLR of constant thickness 132" and a patterned layer 410 on the layer of MCPET/DLR of constant thickness 132". The patterned layer 410 may include an array of intersecting lines, an array of islands, such as dots or other features, and/or any other patterned layer. The patterned layer 310 may be reflective. The patterned layer 410 may be uniform across the enclosure 430, or may vary in thickness, density and/or type of pattern across the enclosure 430. Moreover, a patterned layer 310 may be provided inside and/or outside the enclosure 430. Thus, in some embodiments, an enclosure may include a highly reflective inside surface and is perforated with a large number of small holes to let some of the light out. Light not exiting the holes is reflected back in, so that it can exit a different hole in a different direction. Finally, embodiments of FIG. 4 may be combined with embodiments of FIGS. 1, 2 and/or 3 in various other combinations, so that, for example, a layer of MCPET/DLR of variable thickness 132 of FIG. 1 is provided.

Accordingly, an LED lighting system 400 according to various embodiments can include at least one LED 110 and an enclosure 430 adjacent, and in some embodiments surrounding, the at least one LED 110, so that at least some light (and in some embodiments at least about 90%, 96% or 98% of the light) that is emitted by the at least one LED 110 passes through the enclosure 430. The enclosure 430 comprises a transmissive material 132" having a patterned reflective layer 410 thereon. The patterned reflective layer 410 may comprise an array of lines and/or islands.

Figure 5:
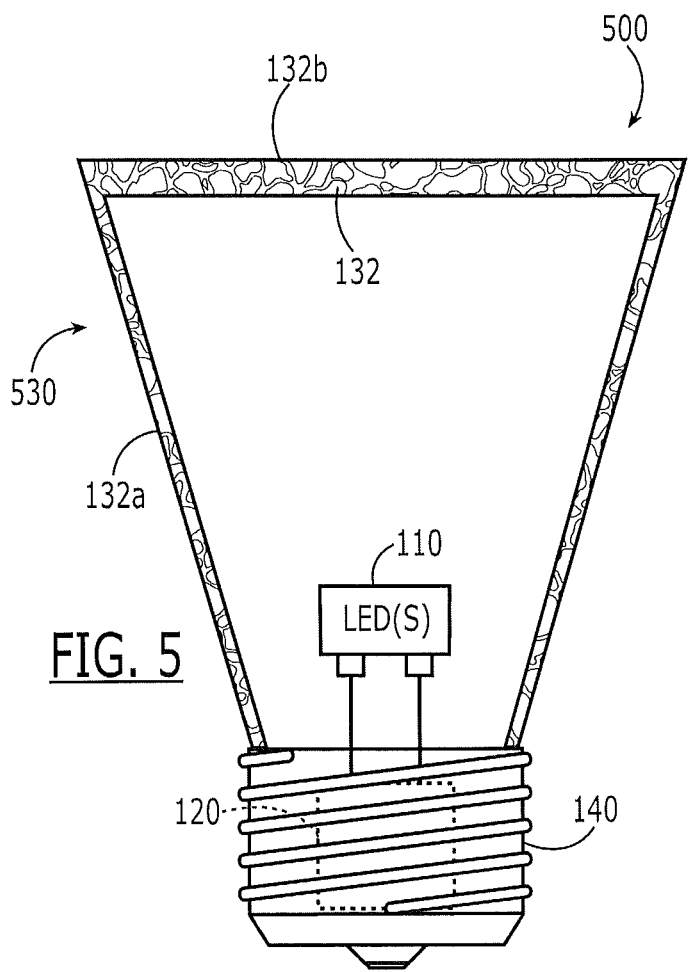

FIGS. 1-4 illustrate LED lighting systems in the form of a replacement for an A-type incandescent lamp. However, other embodiments may provide a replacement for a PAR 38 incandescent lamp or other form factors. In particular, FIG. 5 illustrates an embodiment that is similar to FIG. 1, but is in the configuration of a PAR 38 incandescent lamp. Thus, LED lighting systems 500 of FIG. 5 include an enclosure 530 having a layer of low absorption diffusing material such as MCPET/DLR of non-uniform thickness 132, where the wall 132a is thicker than the ceiling 132b, to provide a lower transmittance-to-reflectance ratio on the wall 132a than on the ceiling 132b. The wall 132a and/or the ceiling 132b itself may also be non-uniform in thickness in other embodiments. Other analogous embodiments to FIGS. 2, 3 and/or 4 may also be provided for a PAR 38 bulb.

Accordingly, various embodiments described herein can use reflective and transmissive properties of a film or other surrounding material to provide mixed light output from the light sources contained within an enclosure defined by the material. Various embodiments can balance the reflectivity from the material that reflects light back into the enclosure with the transmission through the material (i.e., the transmittance-to-reflectance ratio), so that the light that is transmitted is a substantially uniform color across the surface area of the material and absorption is reduced or minimized. Substantially uniform color may be defined as meeting the color uniformity requirements of the L Prize.

Highly reflective and diffusive microcellular materials, such as MCPET and/or DLR, have very little loss in reflection (e.g., about 2% or less), but may also have microporous characteristics, so as to transmit light through them. The level of transmission from an enclosure may be controlled by, for example, varying the thickness of MCPET/DLR (e.g., FIGS. 1, 3 and 5), by providing a non-uniform array of holes (e.g., FIG. 2), by varying the thickness of a transmissive/reflective layer on the MCPET (e.g., FIG. 3) and/or providing strips or dots of reflective material on an otherwise transmissive material (e.g., FIG. 4). The holes may comprise micropores that are created by the scattering from the microcells. Adjusting the balance between the amount of light transmitted and the amount of light reflected may control the number of bounces of light within the enclosure before the light is transmitted through the enclosure material. The number of bounces should be sufficient to mix the light from different color sources, single sources that emit multiple colors (for example, phosphor-converted LEDs that have a blue spot or yellow ring) and/or obscure multiple sources of the same color. This may be achieved by areas of high reflectivity and other regions of high transmissivity, and the ratio of number of regions and/or the comparative sizes of the regions may be adjusted to provide adequate color mixing. The sizes of the regions can range from, for example, square micrometers to square centimeters. Accordingly, various embodiments described herein may be counterintuitive in that at least some light that is emitted by the LED(s) is not allowed to initially escape through the enclosure, but is reflected back into the enclosure at least once.

Heretofore, MCPET/DLR have been used as a reflective sheet in backlight systems or sign boards, due at least in part to their high reflectivity, high diffusivity and relatively equivalent reflectivity/diffusivity across the visible spectrum. However, various embodiments described herein can use the MCPET/DLR for its transmissive properties, as well. Heretofore, the transmittance-to-reflectance ratio was minimized so that very little transmittance and very high reflectance was provided. In sharp contrast, various embodiments described herein can provide a lower transmittance-to-reflectance ratio, so that some light can exit the enclosure without bounce, and the remaining light that is reflected can also exit the enclosure after one or more bounces. Moreover, by varying the transmittance-to-reflectance ratio over various portions of the enclosure, a substantially uniform color and/or intensity may be provided across the surface area of the enclosure, notwithstanding the non-uniform illumination pattern of the LED(s) and/or the use of multiple LEDs of the same and/or different colors. Accordingly, low absorption diffusing materials such as MCPET/DLR may be used in a manner that is different from their intended use, for example by making the MCPET/DLR thinner than is conventional, non-uniform and/or including holes and/or micropores, to increase their transmissivity.

It will be understood that a differing transmittance-to-reflectance ratio has been described herein as being provided by varying the thickness of the layer of MCPET/DLR and/or by varying the thickness and/or patterning of a layer on the layer of MCPET/DLR. The varying thickness of MCPET/DLR may be provided by initially molding a layer of MCPET/DLR of varying thickness and/or by abrading, scraping and/or otherwise selectively removing at least some of the MCPET/DLR from a layer of MCPET/DLR. This selective removal may take place prior to forming the enclosure and/or after forming the enclosure. Moreover, other embodiments may vary the transmittance-to-reflectance ratio by varying the density and/or average cell size of the MCPET/DLR cells themselves to create micropores. Moreover, the transmittance-to-reflectance ratio may be varied in other embodiments by providing a non-uniform array of holes and/or micropores that extend through the MCPET/DLR. The non-uniform array of holes may be provided by initialing molding a layer of MCPET/DLR with holes and/or by otherwise selectively removing the MCPET/DLR after fabrication to provide the holes.

Various embodiments as described herein can conform to the ENERGY STAR Program Requirements for Solid State Lighting Luminaires. Moreover, various embodiments described herein (for example, FIGS. 1-4) can conform to the product requirements for light output, wattage, color rendering index, correlated color temperature, dimensions and base type for a 60-watt A19 Incandescent Replacement for the L Prize. Other embodiments (for example, FIG. 5) can conform to the product requirements for light output, wattage, color rendering index, correlated color temperature, dimensions and base type for a PAR 38 halogen replacement for the L Prize.

Figure 6:
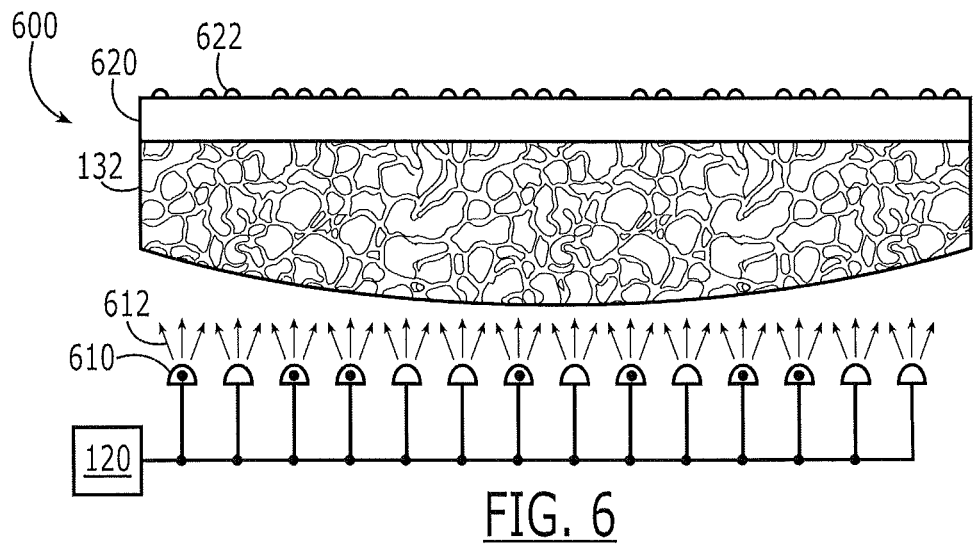

FIG. 6 is a schematic cross-sectional view of an LED lighting system according to various other embodiments. Referring to FIG. 6, the LED lighting system 600 includes a plurality of LEDs 610 of at least two different colors, and a power supply 120 that is electrically connected to, and in some embodiments spaced apart from, the plurality of LEDs 610. The plurality of LEDs 610 may include a bare LED die, an encapsulated or packaged LED and/or an LED (bare or encapsulated) with phosphor therein. The multiple colors of LEDs are indicated by selectively placing a dot (•) in some of the LEDs 610. The multiple colors of LEDs 610 may be interspersed in a random and/or non-random manner.

In some embodiments, the multiple colors of LEDs may include at least one red LED and at least one blue LED, as was described above. In other embodiments, at least one white LED and at least one red LED may be provided. In still other embodiments, at least one blue shifted yellow LED, at least one blue LED and at least one red LED may be provided. In yet other embodiments, at least one blue shifted yellow LED and at least one red LED may be provided.

Specific examples will now be described. In some embodiments, a 2"×2" array of 180 LEDs may be provided by providing 60 blue shifted yellow LEDs and 120 red LEDs interspersed therein. In other embodiments, a 2"×2" array may include 55 blue shifted yellow LEDs, 5 blue LEDs and 120 red LEDs. However, various other configurations of the plurality of LEDs 610 of at least two different colors may be provided.

Still continuing with the description of FIG. 6, a reflective layer, such as a layer of MCPET and/or DLR material 132 is configured so that at least some of the light 612 of at least two different colors impinges on and emerges through the reflective layer. The reflective layer has a transmittance-to-reflectance ratio that is configured to homogenize intensity of the light that emerges through the reflective layer. In some embodiments, as illustrated in FIG. 6, this homogenization of the intensity of light is provided by providing a layer of MCPET/DLR 132 that is of variable thickness. Moreover, in some embodiments, the layer of MCPET/DLR 132 is thinner at the edges thereof than at the center thereof, as illustrated in FIG. 6, to provide a higher transmittance-to-reflectance ratio at the edges thereof than at the center thereof. These low absorption, partially transmissive, partially reflective materials, such as MCPET and/or DLR materials, may also be known in the art as "transflective" materials. However, the term "reflective" will continue to be used herein.

Still continuing with the description of FIG. 6, a diffusion layer 620 is provided on the reflective layer, such as the layer of MCPET and/or DLR material 132, opposite the plurality of LEDs 610, so that at least some of the light 612 that emerges from the reflective layer impinges on and emerges through the diffusion layer 620. The diffusion layer is configured to homogenize color uniformity of the light that emerges from the reflective layer.

Diffusion layers conventionally have a high absorption of light that impinges thereon. In contrast, some embodiments described herein use a diffusion layer 620 that has less than about 15% total absorption of the light that impinges thereon. In other embodiments, the diffusion layer 620 has less than about 4% total absorption of the light that impinges thereon. These diffusion layers may be provided, for example, by a random array of light diffusing features, such as a randomly sized and/or spaced microlens array 622. A suitable diffusion layer may be provided by a Light Shaping Diffuser (LSD®), distributed by Luminit, which can provide 85%-92% transmission in a wide wavelength range of 360-1600 nm as described, for example, in a Luminit Datasheet entitled "*LED Lighting Applications*" and at the Luminit website at the IP address 216.154.222.249. Other suitable low absorption diffusers 620 may be embodied in the ADF series of diffusion films distributed by Fusion Optix, as described at fusionoptix.com and in an article "*Lighting: Obscuration of LEDs.*" Still other low absorption diffusion films may be provided by ACEL diffusion films distributed by Bright View Technologies, as described at brightviewtechnologies.com.

Figure 7:
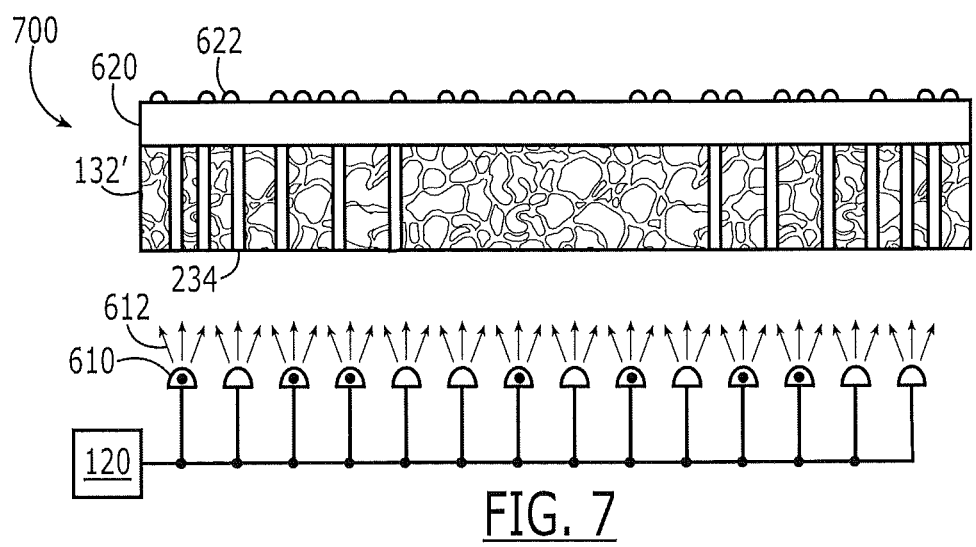

FIG. 7 illustrates other embodiments of LED lighting systems 700. In these embodiments, a layer of MCPET/DLR 132' is provided with the variable transmittance-to-reflectance ratio by providing a non-uniform array of holes 234 therein that extend at least partially through the layer of MCPET/DLR 132' that is of uniform thickness. The non-uniform array of holes 234 may be more closely spaced and/or larger adjacent the edges of the layer 132' than at the center of the layer 132'. However, many other configurations may be provided according to other embodiments. The non-uniform array of holes 234 may also be provided by changing the packing density, depth, shape and/or size of the holes 234. It will also be understood that combinations of non-uniform thickness layers 132 of FIG. 6 and non-uniform arrays of holes 234 of FIG. 7 may also be provided. Moreover, as shown in FIG. 7, in some embodiments, the diffusion layer 620 spans across the holes 234 in the layer of MCPET/DLR 132'.

Various embodiments illustrated in FIGS. 6 and 7, and in subsequent figures herein, may arise from recognition that controlling the spatial variation between the transmissive and reflective properties of a reflective layer can provide highly efficient, uniform illumination of a surface. Thus, for example, a piece of MCPET 132' with a gradient pattern of holes 234, can provide highly efficient, relatively uniform illumination when placed over the LEDs 610. The gradient of holes may include, for example, none at the center progressing to more or less than 50% reflective at the outer edges, as illustrated for example in FIG. 7. Unfortunately, such a structure may not be as useful for a multi-colored source, such as a plurality of LEDs of at least two different colors 610. By introducing multiple colors, the holes 234 in the MCPET/DLR layer 132' may start to act in the same way as the double-slits in a Young's experiment that may create interference patterns on any projected screen. For the purposes of general illumination, the color uniformity of the emitter may be equally as important as the eventual mixing of the light in the far field. Therefore, these interference patterns of varying colors may present an unacceptable aesthetic problem.

Various embodiments illustrated in FIGS. 6 and 7, and in subsequent figures, can reduce or eliminate this problem by enabling some level of diffusion of light emerging from in the holes 234 of the MCPET/DLR layer 132'. By removing the coherence of the light by distributing the light on different paths, the interference pattern may be reduced or eliminated so that a uniformity both in light and in color may be provided. Accordingly, in some embodiments of FIGS. 6 and 7, the reflective layer, such as the layer of MCPET/DLR 132, 132' can be configured to homogenize the intensity of the light that emerges therethrough, whereas the diffusion layer 620 may be configured to homogenize color uniformity of the light that emerges from the reflective layer. It will be understood that the reflective layer also may act in part to homogenize color uniformity and the diffusion layer may also act in part to homogenize intensity of the light. However, in some embodiments, a primary function of the reflective layer is to homogenize intensity of the light, whereas a primary function of the diffusion layer is to homogenize the color uniformity of the light.

Still other embodiments of an LED lighting system 700 as illustrated in FIGS. 6 and 7 include a plurality of LEDs 610 of at least two different colors, a first layer comprising MCPET and/or DLR material 132/132' configured so that at least some of the light of at least two different colors impinges on and emerges through the first layer, and a second layer 620 comprising a randomly sized and/or spaced array of light diffusing features 622 on the first layer opposite the plurality of LEDs 610, so that at least some of the light that emerges from the first layer impinges on and emerges through the second layer 622. In some embodiments, the first layer has a transmittance-to-reflectance ratio that varies at different locations thereof by providing a first layer of MCPET/DLR 132 of variable thickness, as illustrated in FIG. 6 and/or by providing a non-uniform array of holes 234 extending through a layer of MCPET/DLR 132', as illustrated in FIG. 7. The random array of light diffusing features 622 may comprise a microlens array, and the plurality of LEDs of at least two different colors may comprise blue and red LEDs, white and red LEDs, blue shifted yellow, blue and red LEDs and/or other combinations of LEDs.

Figure 8:
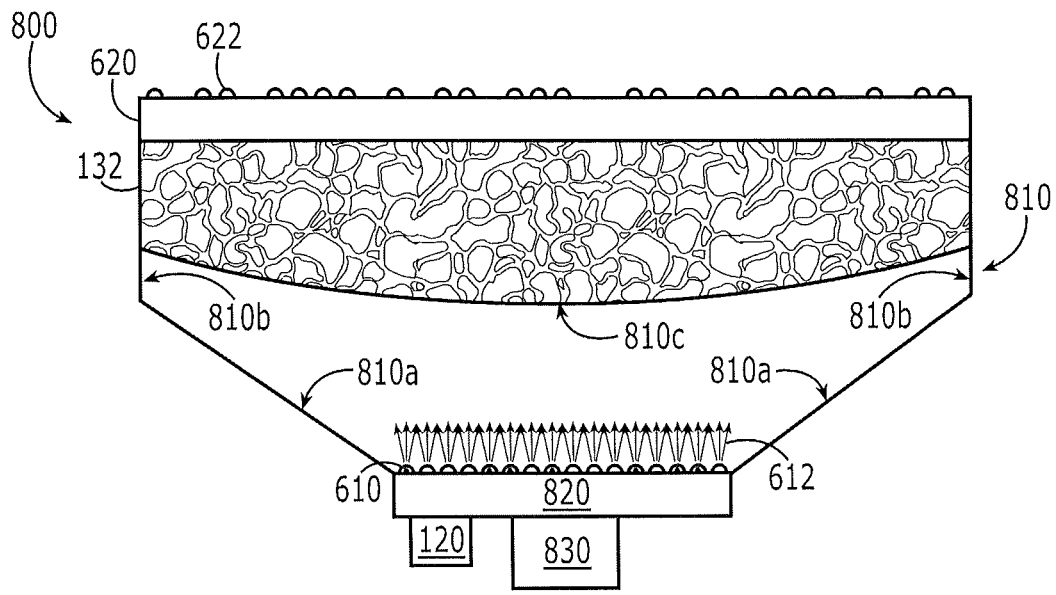
Figure 9:
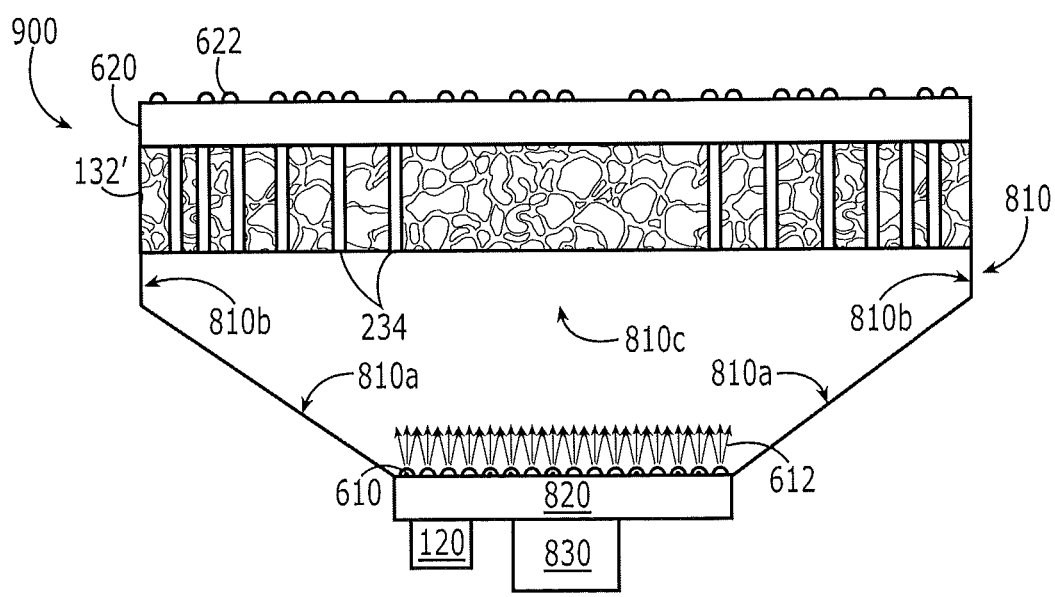
Figure 10:
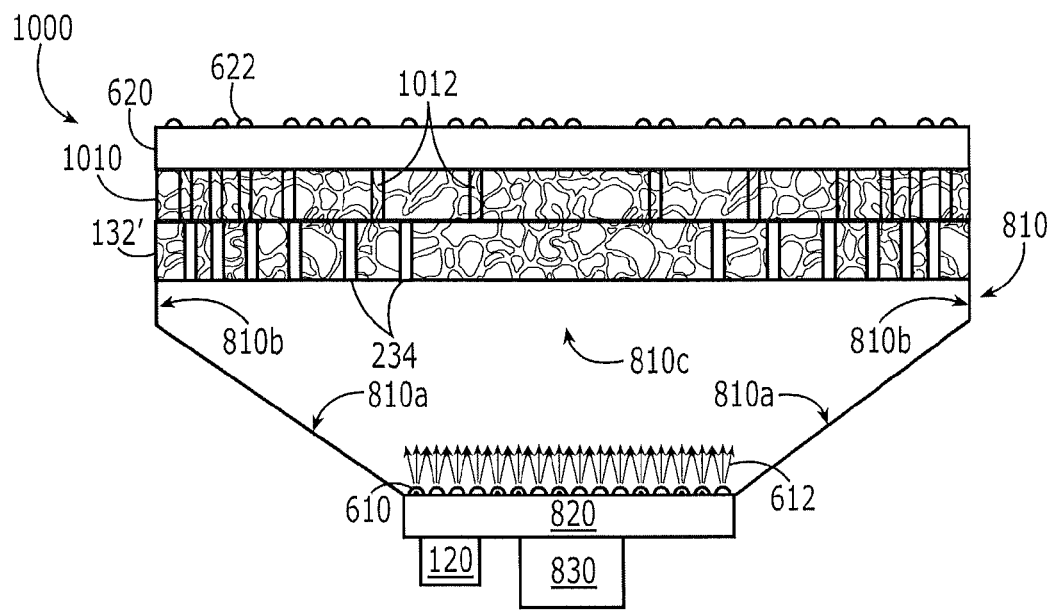

FIGS. 8-10 are schematic cross-sectional views of LED lighting systems according to other embodiments that can provide a replacement or an LR-24 architectural luminaire. These LED lighting systems may further conform to the ENERGY STAR Program Requirements for Solid State Lighting Luminaires.

Referring now to FIGS. 8 and 9, these LED lighting systems 800 and 900 may correspond to the LED lighting systems 600 and 700 of FIGS. 6 and 7, respectively, but may provide an LR-24 form factor.

More specifically, FIGS. 8 and 9 illustrate LED lighting systems 800 and 900, respectively, that include an enclosure 810, 910, respectively, that includes an enclosure floor 810*a*, at least one enclosure wall 810*b*, and an enclosure ceiling 810*c*. The floor 810*a* and the wall(s) 810*b* of the enclosure 810 may also comprise MCPET and/or DLR material. A substrate 820 is provided adjacent the enclosure floor 810*a*. In some embodiments, the substrate 820 may comprise a metal core printed circuit board. A plurality of LEDs 610 of at least two different colors may be provided on the substrate 820 facing the enclosure ceiling 810*c*. A thermal management system 830 that may include heat sinks, heat pipes, etc., is also provided to remove heat from the substrate 820.

As illustrated in FIG. 8, the enclosure ceiling 810*c* may comprise a reflective layer, such as a layer of MCPET/DLR 132, and a diffusion layer 620, as was described in connection with FIG. 6. In other embodiments, as illustrated in FIG. 9, the enclosure ceiling 810*c* may comprise a reflective layer comprising MCPET/DLR 132' and a diffusion layer 620, as was illustrated in FIG. 7.

Additional discussion of various embodiments of FIGS. 8 and 9 will now be provided. In particular, an LR-24 architectural luminaire is marketed by Cree LED Lighting, as described in the Product Information Sheet entitled "*LED Architectural Lay-In LR-24*". This luminaire uses a 7"×7" metal core printed circuit board on which is mounted 60 blue shifted yellow LEDs and 120 red LEDs. The relatively large size printed circuit board is needed to provide sufficient spacing among the LEDs, so as to allow the optics to homogenize the light intensity and color uniformity over an 11"×11" emitting surface. Unfortunately, this relatively large metal core printed circuit board is relatively expensive and/or heavy, and may require large amounts of expensive/heavy heat sinking over the entire surface thereof for heat removal, which adds to the cost and/or weight of the luminaire.

It would be desirable to shrink the metal core circuit board to a smaller size, such as a 2"×2" metal core printed circuit board. This could drastically decrease the cost/weight and allow more efficient heat removal techniques, such as smaller heat sinks and/or heat pipes, to be used. Unfortunately, conventional diffusers or diffuser films may not allow the emission from a 2"×2" substrate to be spread over an 11"×11" emission area over a relatively thin LR-24 luminaire, such as a luminaire that is no more than about 5.8" thick in total. Unexpectedly, however, embodiments of FIGS. 8 and 9 may allow the substrate 820 to be shrunk dramatically, while still allowing substantially uniform intensity and/or substantially uniform color illumination to be provided.

Embodiments of FIGS. 6-9 illustrated a single reflective layer of MCPET/DLR 132, 132'. However, other embodiments may provide a plurality of reflective layers. At least two of the reflective layers may have transmittance-to-reflectance ratios that vary differently at different locations thereof. Thus, for example, in FIG. 10, a first reflective layer MCPET/DLR 132' having a first non-uniform array of holes 234 is provided, as was described in FIG. 9. Variable thickness may also be provided, as was described in FIG. 8. A second reflective layer, such as a second layer of MCPET and/or DLR material 1010 may be provided including a second non-uniform array of holes 1012 extending therethrough. The first array of holes 234 and the second array of holes 1012 are not congruent to each other. Accordingly, two or more reflective layers may be provided. It will also be understood that the second reflective layer 1010 may also be a layer of non-uniform thickness.

Figure 11:
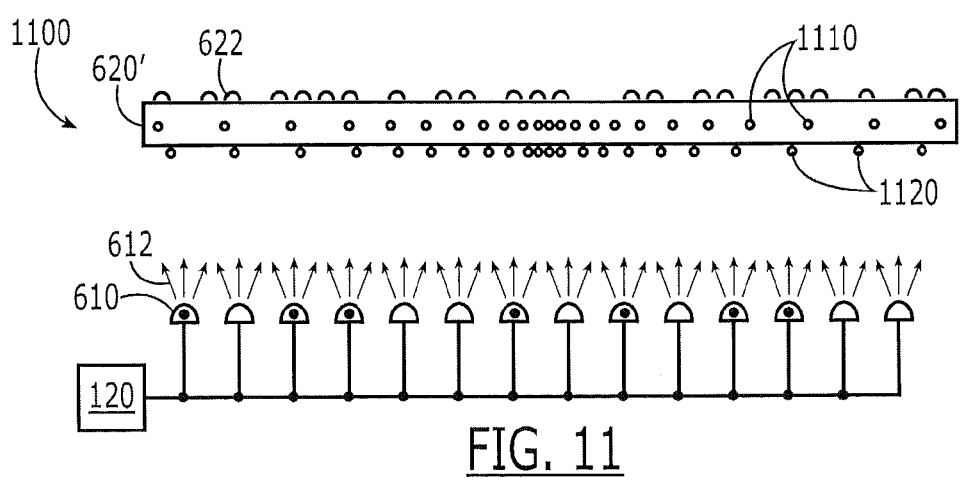

FIG. 11 is a cross-sectional view of other embodiments of LED lighting systems 1100. In embodiments of FIG. 11, the reflective layer may be embodied as a coating on and/or a structure within the diffusion layer itself. Thus, in FIG. 11, a diffusion layer 620' may include an array of randomly sized and/or shaped microlenses 622 thereon, reflective particles 1110 therein and/or reflective particles 1120 thereon, which vary the reflectivity spatially in the diffusion layer 620'. In some embodiments, the density of the reflective particles 1110/1120 may be higher towards the center of the diffusion layer 620' and lower towards the edges of the diffusion layer 620'. Moreover, the internal reflective particles 1110 and/or the external reflective particles 1120 may be replaced by an internal or external layer that has a different transmittance-to-reflectance ratio spatially. Embodiments of FIG. 11 may also be provided in combination with any of the other embodiments of FIGS. 7-10.

It will also be understood that various embodiments of FIGS. 6-11 may also be combined with various embodiments of FIGS. 1-5 in various combinations and subcombinations, to provide, for example, a replacement for an A19-type incandescent lamp, a PAR 38 halogen incandescent lamp and/or other form factors.

Finally, various embodiments described herein may be generalized to provide a lighting system that comprises a plurality of solid state light emitters, such as LEDs, of at least two different colors and a low absorption, partially reflective, partially diffusive layer. The low absorption, partially reflective, partially diffusive layer may be configured so that at least some of the light of at least two different colors impinges on and emerges through the low absorption, partially reflective, partially diffusive layer. In some embodiments, the low absorption, partially reflective, partially diffusive layer may comprise a separate reflective layer and a separate diffusion layer on the reflective layer. Moreover, in some embodiments, the reflective layer is between the plurality of solid state light emitters of at least two different colors and the diffusion layer, whereas in other embodiments, the diffusion layer is between the plurality of solid state light emitters of at least two different colors and the reflective layer.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A light emitting diode (LED) lighting system comprising:
   a plurality of LEDs of at least two different colors;
   a reflective layer configured so that at least some of the light of at least two different colors impinges on and emerges through the reflective layer, the reflective layer having a transmittance-to-reflectance ratio that is configured to homogenize intensity of the light that emerges through the reflective layer; and
   a diffusion layer on the reflective layer opposite the plurality of LEDs so that at least some of the light that emerges from the reflective layer impinges on and emerges through the diffusion layer, the diffusion layer configured to homogenize color uniformity of the light that emerges from the reflective layer.

2. An LED lighting system according to claim 1 wherein the reflective layer has less than about 10% total absorption of the light that impinges thereon.

3. An LED lighting system according to claim 1 wherein the diffusion layer has less than about 15% total absorption of the light that impinges thereon.

4. An LED lighting system according to claim 1 wherein the reflective layer comprises a microcellular layer having a mean cell diameter of less than about 10 μm.

5. An LED lighting system according to claim 1 wherein the reflective layer comprises a microporous layer.

6. An LED lighting system according to claim 1 wherein the reflective layer comprises a layer of microcellular polyethylene terephthalate (MCPET) and/or a layer of Diffuse Light Reflector (DLR) material.

7. An LED lighting system according to claim 1 wherein the reflective layer has a transmittance-to-reflectance ratio that varies at different locations thereof, so as to homogenize the intensity of the light that emerges through the reflective layer.

8. An LED lighting system according to claim 6 wherein the layer of MCPET and/or DLR material is of variable thickness at different locations thereof to provide the transmittance-to-reflectance ratio that varies at different locations thereof, so as to homogenize the intensity of the light that emerges through the reflective layer.

9. An LED lighting system according to claim 6 wherein the layer of MCPET and/or DLR material includes a non-uniform array of holes extending therethrough to provide the transmittance-to-reflectance ratio that varies at different locations thereof, so as to homogenize the intensity of the light that emerges through the reflective layer.

10. An LED lighting system according to claim 1 wherein the diffusion layer comprises a random array of light diffusing features.

11. An LED lighting system according to claim 6 wherein the diffusion layer comprises a random array of light diffusing features.

12. An LED lighting system according to claim 11 wherein the random array of light diffusing features comprises a randomly spaced and/or sized microlens array.

13. An LED lighting system according to claim 1 wherein plurality of LED's comprise a planar array of LED's and wherein the reflective layer and the diffusion layer are planar layers.

14. An LED lighting system according to claim 1 wherein the LED lighting system is an LR-24 architectural luminaire.

15. An LED lighting system according to claim 1 wherein the LED lighting system further conforms to the ENERGY STAR Program Requirements for Solid State Lighting Luminaires.

16. An LED lighting system according to claim 1 wherein the plurality of LEDs of at least two different colors comprise at least one white LED and at least one red LED.

17. An LED lighting system according to claim 1 wherein the plurality of LEDs of at least two different colors comprise at least one blue shifted yellow LED and at least one red LED.

18. An LED lighting system according to claim 7 wherein the reflective layer is a first reflective layer, the LED lighting system further comprising a second reflective layer on the first reflective layer, wherein the second reflective layer has a transmittance-to-reflectance ratio that varies at different locations thereof differently than that of the first reflective layer.

19. An LED lighting system according to claim 9 wherein the layer of MCPET and/or DLR material is a first layer MCPET and/or DLR material and wherein the non-uniform array of holes extending therethrough is a first non-uniform array of holes extending therethrough, the LED lighting system further comprising:
   a second layer of MCPET and/or DLR material on the first layer of MCPET and/or DLR material that includes a second non-uniform array of holes extending therethrough, wherein the first and second arrays are not congruent to each other.

20. A light emitting diode (LED) lighting system comprising:
   an enclosure that comprises an enclosure floor, an enclosure ceiling and at least one enclosure wall therebetween;
   a substrate adjacent the enclosure floor;
   a plurality of LEDs of at least two different colors on the substrate facing the enclosure ceiling;
   the enclosure ceiling comprising:
      a reflective layer configured so that at least some of the light of at least two different colors impinges on and emerges through the reflective layer, the reflective layer having a transmittance-to-reflectance ratio that is configured to homogenize intensity of the light that emerges through the reflective layer; and
      a diffusion layer on the reflective layer opposite the plurality of LEDs so that at least some of the light that emerges from the reflective layer impinges on and emerges through the diffusion layer, the diffusion layer configured to homogenize color uniformity of the light that emerges from the reflective layer.

21. An LED lighting system according to claim 20 wherein the reflective layer has less than about 10% total absorption of the light that impinges thereon.

22. An LED lighting system according to claim 20 wherein the diffusion layer has less than about 15% total absorption of the light that impinges thereon.

23. An LED lighting system according to claim 20 wherein the reflective layer comprises a microcellular layer having a mean cell diameter of less than about 10 μm.

24. An LED lighting system according to claim 20 wherein the reflective layer comprises a microporous layer.

25. An LED lighting system according to claim 20 wherein the reflective layer comprises a layer of microcellular polyethylene terephthalate (MCPET) and/or a layer of Diffuse Light Reflector (DLR) material.

26. An LED lighting system according to claim 20 wherein the reflective layer has a transmittance-to-reflectance ratio that varies at different locations thereof, so as to homogenize the intensity of the light that emerges through the reflective layer.

27. An LED lighting system according to claim 25 wherein the layer of MCPET and/or DLR material is of variable thickness at different locations thereof to provide the transmittance-to-reflectance ratio that varies at different locations thereof, so as to homogenize the intensity of the light that emerges through the reflective layer.

28. An LED lighting system according to claim 25 wherein the layer of MCPET and/or DLR material includes a non-uniform array of holes extending therethrough to provide the transmittance-to-reflectance ratio that varies at different locations thereof, so as to homogenize the intensity of the light that emerges through the reflective layer.

29. An LED lighting system according to claim 20 wherein the diffusion layer comprises a random array of light diffusing features.

30. An LED lighting system according to claim 25 wherein the diffusion layer comprises a random array of light diffusing features.

31. An LED lighting system according to claim 30 wherein the random array of light diffusing features comprises a randomly spaced and/or sized microlens array.

32. An LED lighting system according to claim 20 wherein the enclosure wall and/or the enclosure floor also comprise MCPET and/or DLR material.

33. An LED lighting system according to claim 20 wherein the LED lighting system is an LR-24 architectural luminaire.

34. An LED lighting system according to claim 20 wherein the LED lighting system further conforms to the ENERGY STAR Program Requirements for Solid State Lighting Luminaires.

35. An LED lighting system according to claim 20 wherein the plurality of LEDs of at least two different colors comprise at least one white LED and at least one red LED.

36. An LED lighting system according to claim 20 wherein the plurality of LEDs of at least two different colors comprise at least one blue shifted yellow LED and at least one red LED.

37. An LED lighting system according to claim 26 wherein the reflective layer is a first reflective layer, the LED lighting system further comprising a second reflective layer on the first reflective layer, wherein the second reflective layer has a transmittance-to-reflectance ratio that varies at different locations thereof differently than that of the first reflective layer.

38. An LED lighting system according to claim 28 wherein the layer of MCPET and/or DLR material is a first layer MCPET and/or DLR material and wherein the non-uniform array of holes extending therethrough is a first non-uniform array of holes extending therethrough, the LED lighting system further comprising:
  a second layer of MCPET and/or DLR material on the first layer MCPET and/or DLR material that includes a second non-uniform array of holes extending therethrough, wherein the first and second arrays are not congruent to each other.

39. A light emitting diode (LED) lighting system comprising:
  a plurality of LEDs of at least two different colors;
  a first layer comprising microcellular polyethylene terephthalate (MCPET) and/or Diffuse Light Reflector (DLR) material configured so that at least some of the light of two different colors impinges on and emerges through the first layer; and
  a second layer comprising a randomly spaced and/or sized array of light diffusing features on the first layer opposite the plurality of LEDs so that at least some of the light that emerges from the first layer impinges on and emerges through the second layer.

40. An LED lighting system according to claim 39 wherein the first layer has a transmittance-to-reflectance ratio that varies at different locations thereof.

41. An LED lighting system according to claim 40 wherein the first layer is of variable thickness at different locations thereof to provide a transmittance-to-reflectance ratio that varies at different locations thereof.

42. An LED lighting system according to claim 40 wherein the first layer includes a non-uniform array of holes extending therethrough to provide a transmittance-to-reflectance ratio that varies at different locations thereof.

43. An LED lighting system according to claim 39 wherein the light diffusing features comprises a microlens array.

44. An LED lighting system according to claim 39 wherein the LED lighting system is an LR-24 architectural luminaire.

45. An LED lighting system according to claim 39 wherein the LED lighting system further conforms to the ENERGY STAR Program Requirements for Solid State Lighting Luminaires.

46. An LED lighting system according to claim 39 wherein the plurality of LEDs of at least two different colors comprise at least one white LED and at least one red LED.

47. An LED lighting system according to claim 39 wherein the plurality of LEDs of at least two different colors comprise at least one blue shifted yellow LED and at least one red LED.

48. An LED lighting system according to claim 40 further comprising a third layer comprising MCPET and/or DLR material on the first layer, wherein the third layer has a transmittance-to-reflectance ratio that varies at different locations thereof differently than that of the first layer.

49. An LED lighting system according to claim 42 wherein the non-uniform array of holes is a first non-uniform array of holes extending therethrough, the LED lighting system further comprising:
  a third layer comprising MCPET and/or DLR material on the first layer and that includes a second non-uniform array of holes extending therethrough, wherein the first and second arrays are not congruent to each other.

* * * * *